United States Patent
Jordil et al.

(10) Patent No.: US 8,535,208 B2
(45) Date of Patent: Sep. 17, 2013

(54) TOOL RACK FOR COORDINATE MEASURING MACHINE AND CORRESPONDING TOOL

(75) Inventors: Pascal Jordil, Ecoteaux (CH); Benjamin Vullioud, Gollion (CH)

(73) Assignee: Hexagon Metrology AB, Nacka Stand (SE)

(*) Notice: Subject to any disclaimer, the term of this patent is extended or adjusted under 35 U.S.C. 154(b) by 1586 days.

(21) Appl. No.: 11/758,262

(22) Filed: Jun. 5, 2007

(65) Prior Publication Data

US 2008/0132393 A1   Jun. 5, 2008

(30) Foreign Application Priority Data

Dec. 5, 2006   (EP) .......................... 2006EP-125417

(51) Int. Cl.
*B23Q 3/155*   (2006.01)
(52) U.S. Cl.
USPC .................. 483/16; 483/59; 483/60; 211/70.6
(58) Field of Classification Search
USPC .............. 483/16, 13, 59, 60, 61, 69, 58, 901; 211/70.6, DIG. 2
See application file for complete search history.

(56) References Cited

U.S. PATENT DOCUMENTS

| | | | |
|---|---|---|---|
| 4,604,787 A | 8/1986 | Silvers, Jr. | |
| 4,631,834 A * | 12/1986 | Hayashi et al. ................. | 33/503 |
| 4,649,623 A * | 3/1987 | Schneider et al. .............. | 483/69 |
| 4,651,405 A | 3/1987 | McMurtry | |
| 5,028,901 A | 7/1991 | Enderle et al. | |
| 5,672,145 A * | 9/1997 | Pollington et al. .............. | 483/59 |
| 5,674,170 A * | 10/1997 | Girardin ........................ | 483/59 |
| 6,142,920 A * | 11/2000 | Ogura ............................ | 483/59 |
| 6,641,511 B2 * | 11/2003 | Patel et al. ..................... | 483/59 |
| 2003/0130101 A1 * | 7/2003 | Hwang .......................... | 483/59 |
| 2005/0014620 A1 * | 1/2005 | McMurtry et al. .............. | 483/59 |

FOREIGN PATENT DOCUMENTS

| | | |
|---|---|---|
| EP | 0416524 A1 | 3/1991 |
| EP | 0426492 A2 | 5/1991 |
| EP | 0566719 B1 | 10/1993 |
| EP | 1577050 A1 | 9/2005 |
| EP | 1669713 | 6/2006 |
| WO | 03083407 | 10/2003 |

OTHER PUBLICATIONS

Machine Translation of EP 1669713 A1, which EP '713 was published Jun. 14, 2006.*

* cited by examiner

*Primary Examiner* — Erica E Cadugan
(74) *Attorney, Agent, or Firm* — Pearne & Gordon LLP

(57) ABSTRACT

Tool rack for tools of a coordinate measuring machine, wherein the guiding and retaining surfaces of the tool rack are arranged on two planes offset vertically so as to cause the tool to tilt when it is unhooked. The inventive arrangement allows the mechanical efforts during uncoupling to be reduced appreciably. This reduction is due to the tool tilting and to the residual magnetic force being divided between three retaining point, with a positive effect on the coupling precision and on the tool positioning in the tool rack.

14 Claims, 5 Drawing Sheets

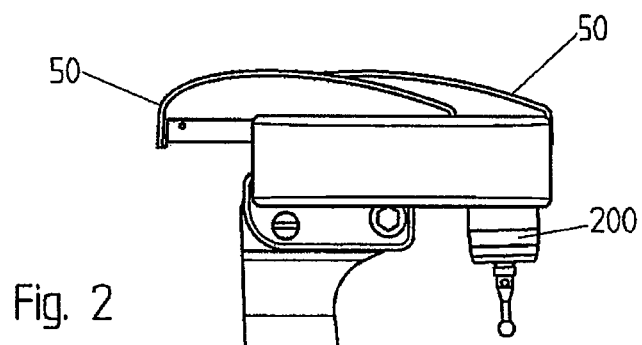
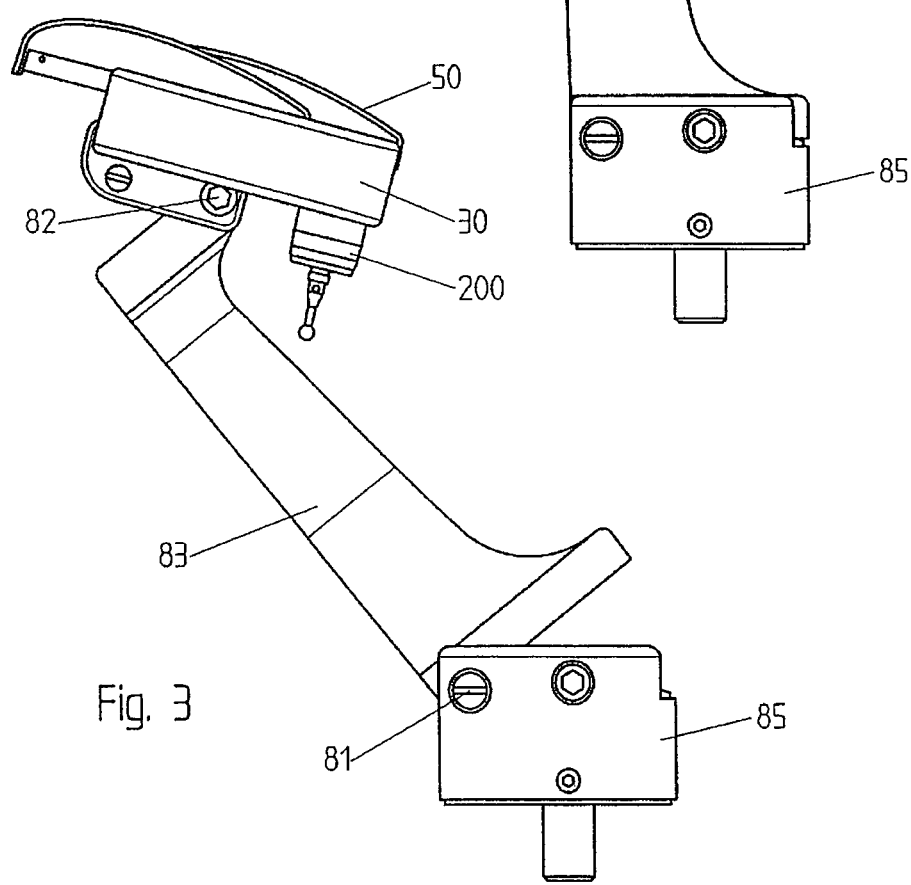

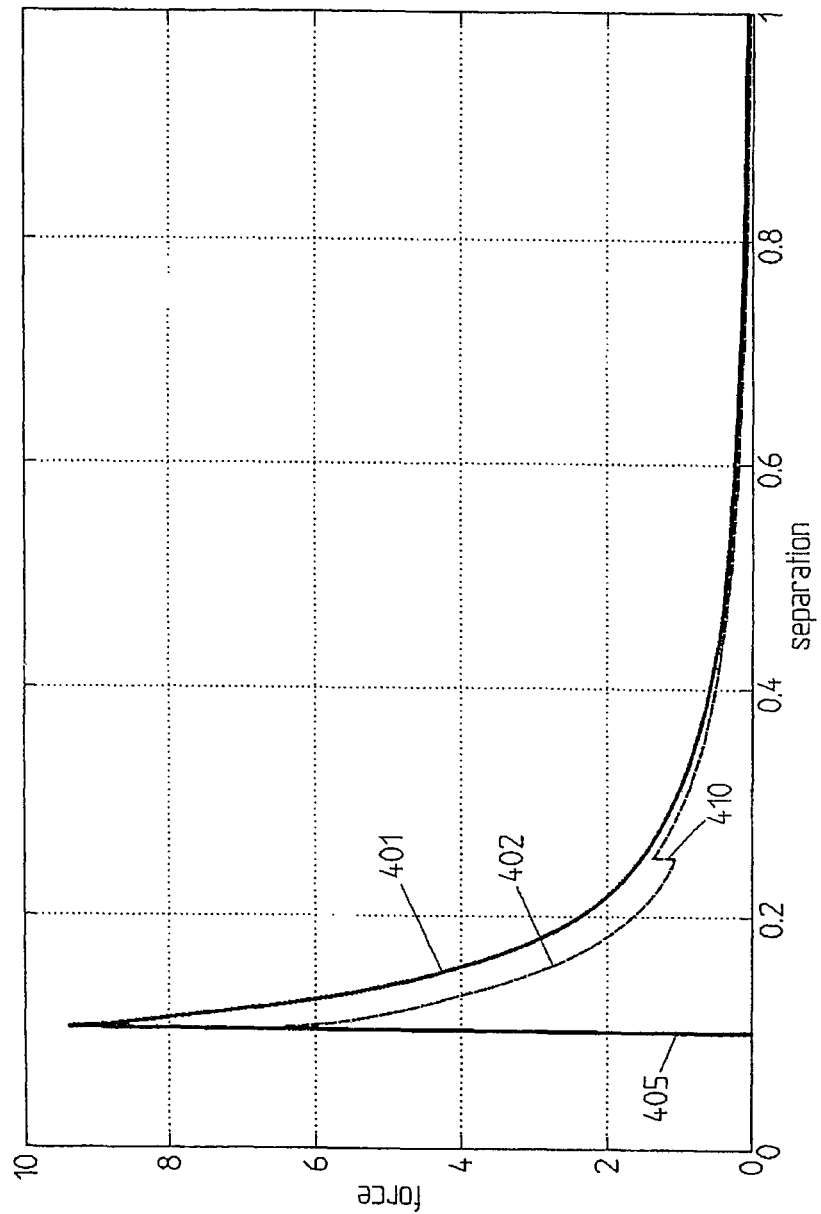

TOOL RACK FOR COORDINATE MEASURING MACHINE AND CORRESPONDING TOOL

REFERENCE DATA

This application claims priority from European patent application 2006EP-125417 filed on Dec. 5, 2006, the contents of which are hereby incorporated by reference.

TECHNICAL FIELD

The present invention concerns a system of tools connectable to a coordinate measuring machine, for example a touch probe, a video camera or any other mechanical or optical measuring tool that preferably sends electric signals, as well as a tool rack allowing the tools to be automatically exchanged during a measuring operation using the machine and a corresponding tool. The present invention is not restricted to the field of metrology or the measuring of dimensions but can be applied to robots with interchangeable tools or to any other system comprising automatically interchangeable tools.

STATE OF THE ART

Several examples of coordinate measuring machines with automatically interchangeable tools are already known. They are generally measuring systems in which the mobile head of the measuring machine and the tools have mutually coupling devices that can be locked and unlocked automatically and that are capable of establishing a very accurate and stable mechanical connection between the machine's measuring head and the chosen tool.

The known systems also have tool racks placed in the measuring machine's work volume and in which the machine can place the tools at the end of a measuring operation and retrieve the tool required for the next task. The measuring machine can thus perform series of complex measurements following a sequence of programmed movements or upon manual commands from an operator.

The precision of the coupling between the measuring head and the different tools is obviously of prime importance for the accuracy of the measurements. It is also very important that this coupling be highly reproducible to avoid calibration operations at each tool changing. For this purpose, an isostatic connection with exactly six contact points between the measuring head and the tool is often provided so as to determine exactly the positioning of the tool relative to the measuring head. Patent application EP1577050 describes a connection with three pins with axes separated by 120° on the measuring head and three couples of balls positioned correspondingly on the tool, thus creating an isostatic connection, that is, a connection in which the tool is held in its position by exactly six linearly-independent mechanical constraints. In such a system, the position of the tool and the constraining forces are exactly determined.

In this type of connection, the accuracy rests on the quality of the contact surfaces. It is thus important during connecting and disconnecting operations to avoid or limit the shocks that can modify or alter these surfaces.

Document U.S. Pat. No. 4,651,405 describes measuring tools designed to be connected on the arm of a coordinate measuring machine through a mechanical connection, using an appendage on the tool that engages with a cam of the measuring head. The tool is locked on the machine when the cam is turned by 90° by another tool provided to this effect. If this operation is to be automated, the tool rack must contain one or several actuator for actuating the cam and switch from the locked to the unlocked position and inversely, according to needs.

These devices have, for each position of the tool rack, an actuator for actuating the cam and locking or unlocking the tool, respectively. These actuators, and the associated control devices, increase the complexity and the cost of the tool rack and require the described cam systems.

Patent application EP416524 describes a probe and a tool rack with a magnetic connection between the head and the touch probe, having a permanent magnet and an electromagnet. When the tool is switched, the magnetic force can be neutralized by an electromagnet in the measuring head, thus allowing the measuring head and the tool to separate. U.S. Pat. No. 5,028,901 describes a similar system in which the electromagnet is external and separated from the measuring head.

A limitation of these known systems is that they require an additional element, which increases the cost, the complexity and the dimensions of the measuring head.

Patent EP426492 describes an interchangeable touch probe connected by magnets to the probe's body. This probe does not have elements designed to interface it with an automatic tool switching system.

U.S. Pat. No. 4,604,787 describes an industrial robot arm with interchangeable tools, capable of placing a tool in a lodging of a tool rack and of seizing a new tool from the same tool rack. The tool rack has lodgings for tools, in which the tools can be slid along a direction transverse to their axis and are held axially. The mechanical connection between the arm and the tool opens automatically under the effect of an axial separating force exceeding a predetermined threshold.

Patent EP566719 describes a tool system and a tool rack in which the tools have a permanent magnet and are held magnetically on the corresponding measuring head. The separation between the tool in the tool rack and the measuring head occurs under the action of an axial wrenching force exceeding the magnetic attraction, in an analogous manner to what is described in document U.S. Pat. No. 4,604,787.

In these systems, the axial force required for wrenching the tool is considerable and this causes problems to achieve high precision. It is thus important, for the measuring system's accuracy, that the tool rack, the tool and the arm of the measuring machine do not sustain mechanical efforts that are excessively high, causing a loss of adjustment and a measuring inaccuracy.

SHORT SUMMARY OF THE INVENTION

One aim of the present invention is to propose an interchangeable tool and a corresponding tool rack free from the limitations of the known devices.

The invention also has the aim of increasing the precision and the reproducibility of the tool switching operation.

These aims are achieved by the devices according to the present invention.

BRIEF DESCRIPTION OF THE FIGURES

Examples of embodiments of the invention are indicated in the description illustrated by the attached figures in which:

FIG. 2 illustrates the tool rack of FIG. 1 with a lodging occupied by one tool, in this case a probe for a coordinate measuring machine.

FIG. 3 illustrates the inventive tool rack in a folded position, according to one aspect of the invention.

FIG. 7 shows diagrammatically the magnetic force at tool disconnection in a device according to one aspect of the invention.

EXAMPLES OF EMBODIMENTS OF THE INVENTION

Figure 1:
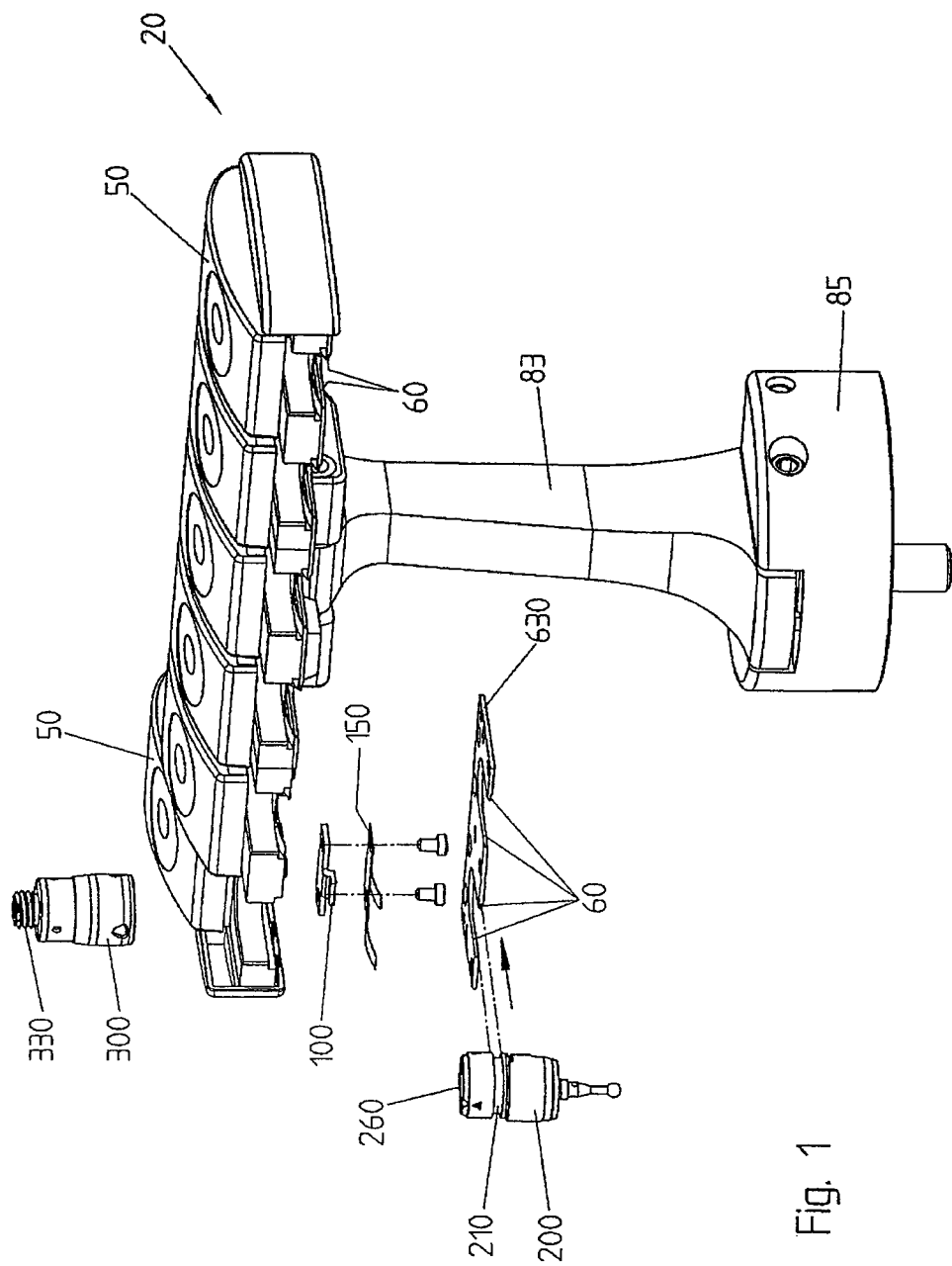
FIG. 1 illustrates a tool rack with lodgings for several tools according to one embodiment of the invention.

FIG. 1 illustrates a tool rack 20 specially designed for accommodating interchangeable tools 200 of a coordinate measuring machine (CMM), and the following description will refer to this particular application. The invention is however not limited to this application but it is understood that it can also apply to tool racks for automatic machine-tools, industrial robots or any other machine with interchangeable tools.

The tool rack 20 has a base 85 for fastening it in the CMM's operation volume. Typically, the base 85 is solidly fastened on the machine's reference plane (not visible), on which the measuring parts are also placed. Other arrangements are however possible. The position of the tool rack 20 in the measuring machine's referential is determined prior to the measurement and when the tool is switched, for example by the coordinates of a series of predefined reference points recorded during a calibration operation well known to the one skilled in the art.

In the following description, the vertical direction will be referred to as being the direction perpendicular to the plane of reference of the measuring machine, which is conventionally a horizontal reference plane. These references made to conventional orientations have the only purpose to improve readability of the description and do not limit the invention, which could apply to tool racks oriented along any direction in space. The terms "up" and "down", "upper" and "lower" must also be interpreted as descriptive and non-limiting terms, relative to these conventional orientations.

The tool rack 20 preferably has a plurality of lodgings for storing a plurality of tools 200. In this manner, it is possible to execute complex measurements using different tools, the CMM being arranged to place a tool in an available lodging of the tool rack 20 and to then retrieve another tool in a lodging each time it is necessary. Advantageously, and with reference to FIG. 2, the lodgings are borne by an upper body 650, raised relative to the base 85 by the arm 83, so as to be able to accommodate tools of different heights without fear of contact with the reference surface.

With reference to FIG. 3, the arm 83 is preferably articulated along the axes 81 and 82 so as to fold back in case of collision. In this manner, it is possible to reduce the risk of damage following for example a wrong manipulation on the measuring machine, causing a shock between the measuring head, or even the measuring head and the tool rack. In normal conditions, the tool rack 20 is held in the unfolded position of FIG. 2 by accurate elastic devices of known type, not represented. Shock absorbers, also not visible in the figure, absorb the folding back of the tool rack in case of shocks.

Figure 4:
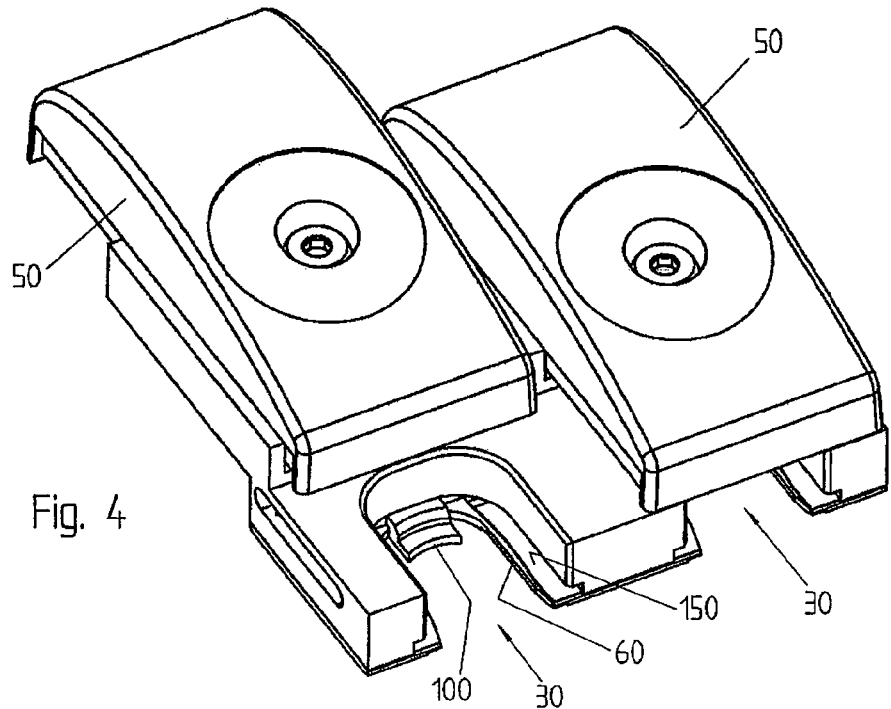
FIG. 4 shows in detail two lodgings of the tool rack of the invention, seen from above in isometric representation.

Each lodging 30 preferably has a protective cover 50, visible in detail in FIG. 4, capable of sliding along a horizontal direction between an open position, in which the corresponding lodging is accessible, and a closed position, protecting the lodging 30 and any tool therein. The protections 50 can also, according to one embodiment, lock in open position.

Figure 5:
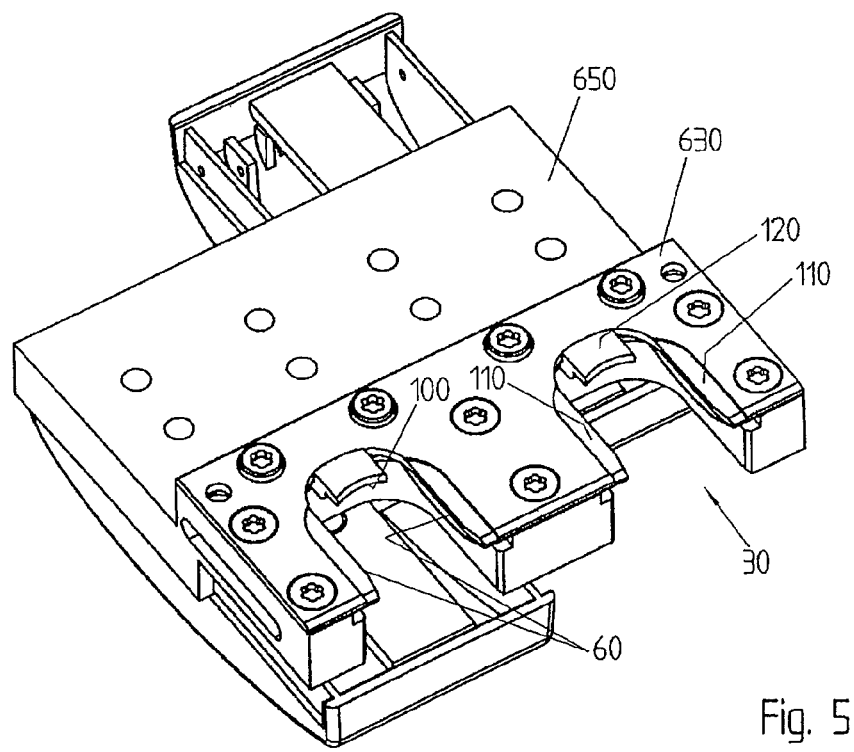
FIG. 5 shows in detail two lodgings of the tool rack of the invention, seen from below in isometric representation.

Each lodging 30 also has guides 60 allowing the tools to be inserted into the lodging along a horizontal direction and removed from the lodging 30 along the same direction. According to the embodiment of the invention represented by FIG. 1 and, in more detail, by FIG. 5, the tool rack 20 has a body 650 resting on the arm 83 and on which the protective covers 50 slide. The guides 60 are constituted by two rectilinear and parallel edges cut out in a metallic plate 630 screwed or fastened on the body 650.

The tool 200 has engaging surfaces or zones 210, working with the guides 60. In the example represented (FIG. 1), the engaging surfaces are surfaces of a ring groove of square or rectangular cross section 210 symmetrically surrounding the circular body of the tool 200. Other arrangements are however also possible.

The connection between the tools and the measuring machine is effected through an adapter 300, fastened on the mobile head of the measuring machine. In the embodiment represented (FIG. 1), the adapter is fastened to the mobile head (not visible) by a threaded rod 330. Other fastening systems are however possible and included in the present invention. The tool 200 and the adapter 300 are preferably connected in accurate and reproducible manner by magnetic elements 260, for example permanent magnets, and by a system of precision contact elements, for example three pins whose axes are separated by 120° on the measuring head and three couples of balls positioned correspondingly on the tool, thus creating an isostatic connection that determines exactly the positioning of the tool relative to the measuring head.

In the represented case of a screwable adapter, an annular or at least axially symmetric engagement surface 210 is particularly suitable. It is indeed difficult to ensure a determined angular position of the adapter on the head, since the latter depends on the retaining force and on the friction between the surfaces. The ring groove 210 does not have a preferred orientation and can fulfill its function, as will be explained further below, independently of the relative angle or positioning of the tool relative to a vertical axis.

When a tool is placed in the tool rack, the measuring machine moves its measuring head, with the adapter 300 and the tool 200, opposite a lodging of the tool rack 20, with the groove 210 being aligned with the guides 60. The measuring head then moves horizontally along a direction parallel to the guides 60, until the guides 60 engage in the groove 210. The inside diameter of the groove 210 corresponds to the distance between the guides 60, with enough play, for example a play of some tenths of millimeter, to allow an easy insertion without lateral constraints.

The cover 50, if there is one, is normally held in closed position by a spring or any other suitable elastic element. During the above mentioned horizontal displacement, the adapter 300 comes into contact with the cover and makes it slide to access the lodging of the tool rack.

With reference to FIG. 4, each lodging has a tooth 100, between the guides 60. The insertion of the tool 200 between the guides 60 ends when the tooth 100 engages at least partially in the groove 210. According to one aspect of the invention, the lower surface 120 of the tooth 100 is not aligned on the horizontal plane of the lower surfaces 100 of the guides 60. For example, the lower surface 120 of the tooth 100 is shifted downwards by 0.10-0.50 mm relative to the plane of the lower surfaces 110 of the guides 60.

The tool 200 is disconnected from the adapter 300 in the following manner: the measuring machine is actuated so as to cause a vertical movement of the measuring head upwards.

Figure 6:
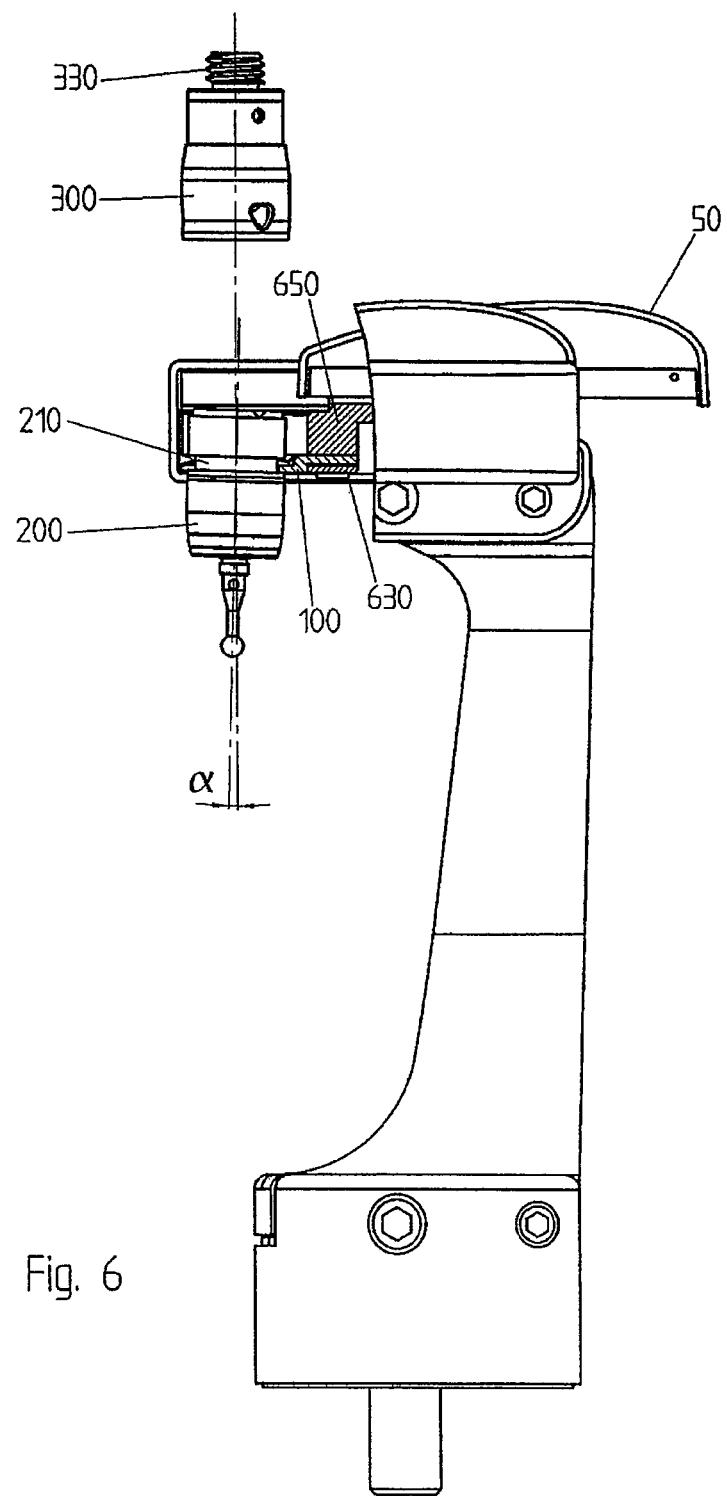
FIG. 6 illustrates the position of the tool in the tool rack after the tool has been disconnected from the measuring head.

During this movement, the lower surface 120 of the tooth 100 (see FIG. 5) comes into contact with the lower inside surface of the groove 210. From this moment, the tool can no longer follow the adapter's vertical movement as it is held back by the retaining surface 120 of the tooth 100. Two effects are then produced:

1. Since the magnetic connecting force and the force applied by the tooth 100 are not aligned, a separation appears between the adapter 300 and the tool 200. The latter tilts by an angle α (see FIG. 6) until the groove 210 of the tool comes into contact with the lower surfaces 110 of the guides 60. Thanks to the lever effect, the force applied by the tooth 100 is considerably lower than the total magnetic attraction force.
2. The tilting increases the air gap between the magnetic elements on the tool 200 and the adapter 300. The magnetic force depends very appreciably on the air gap, the tilting causes a significant reduction of the attraction force and makes the tool prone to unhook.

The tilting is limited by the lower retaining surfaces 110 (see FIG. 5) of the guides 60 coming into contact with the lower surface of the groove 210. From this moment, the vertical force exerted by the tool rack 20 on the tool 200 is divided between the two lower retaining surfaces 110 of the guides 60 and the lower retaining surface 120 of the tooth 100. When this force exceeds the magnetic attraction, reduced following the tilting, the tool 200 is completely separated from the adapter 300.

The inventive arrangement allows the mechanical efforts exerted on the guides 60 during uncoupling to be significantly reduced. This reduction is due to the tool tilting and to the fact that the residual retaining force due to the magnetic effect is divided between the two lower retaining surfaces 110 of the guides 60 and the lower retaining surface 120 of the tooth 100. This division of the force onto three contact points or areas has a positive effect on the coupling precision.

For example, an offset of the lower surfaces between the tooth 100 and the lower retaining surfaces of the guides 60 by 0.25 mm is enough to cause a tilting angle of 2° approximately, which is very efficient.

FIG. 7 shows the vertical component of the magnetic force at tool disconnection. The curve 402 refers to a tool rack including retaining surfaces arranged to tilt the tool upon disconnection, while the curve 401 is relative to the known case in which the tool is not tilted. It can be appreciated that, at the initial contact point 405, the disconnection force is appreciably lower in the tilting case, by reason of the lever effect mentioned above. The point 410 corresponds to the maximum tilt of the tool, i.e. when the tool contacts the retaining surfaces and the guides of the tool rack at three points and cannot tilt any further. From this point onwards, the lever reduction ceases, the magnetic force is however appreciably lower than the maximum force in the straight case 401.

The blade springs 150 (see FIGS. 1 and 4) rest on the upper surface of the groove 210, causing a certain friction, in order to avoid any undesired movement of the tool in the lodging, for example following vibrations, without however completely locking the tool 200 or causing considerable efforts on the head when the tool is switched. In this manner, when the tool is retrieved again, the measuring head will be able to find it again at exactly the same position and in the same orientation where it has been left since becoming disconnected. According to one embodiment, the blade springs 150 could be replaced by one or several permanent magnets or magnetic elements in the tool rack 20.

In order to load another tool, the measuring machine is actuated so as to center above the known position of a tool in a chosen lodging, possibly by moving the cover 50 if there is one. The head is then moved vertically downwards until the tool 200 connects with the adapter 300 and until the groove 210 is no longer in contact with either the lower retaining surface of the tooth 100 or those of the guides 60. Finally, the head moves horizontally, in the direction defined by the guides 60, until the tool 200 is completely disengaged from the tool rack 20.

An accurate and reproducible coupling of the tool 200 depends critically on the latter's position in the tool rack 20. It is important, notably, that the tool rests in its lodging exactly in the same position and along the same orientation as when left in the lodging by the measuring machine and this with minimal mechanical constraints. In this manner, the coupling can take place accurately. The springs 150 preferably allow the tool to move slightly for the coupling operation, allowing the isostatic means to position themselves accurately. The poor positioning of the tool 200 or of the tool rack 20 on a CMM can cause shocks during reconnection that damage the calibrating and measuring precision and irreversibly alter the contact surfaces.

In order to ensure the stability of the tool 200 on the adapter 300, even when being dynamically displaced, the magnetic attraction force between these two elements is generally considerable enough, on the order of 10 N or more, to prevent the tool from getting lost when the machine is working. It is difficult to wrench the tool 200 from the adapter 300 at a single go without introducing undesirable displacements or vibrations during uncoupling. The inventive device allows this separation to be performed gradually and without these faults, by distributing the mechanical efforts on three retaining surfaces, reducing the magnetic attraction force by tilting the tool and orienting the tool for unhooking so as to avoid random unhooking as is the case when the tool is not inclined in a preferred fashion.

Advantageously, the inventive device ensures that the contacts and separations of the contact elements between the tool 200 and the adapter 300 always follow in the same order, during hooking and unhooking. This improves considerably the coupling's precision and reproducibility.

The inventive tool rack 20 further has the advantage that the disconnection and the connection of the tools are performed only by passive elements and by the measuring machine's movements without having to use additional actuators to lock or unlock the tool.

The invention claimed is:

1. The combination of a measuring tool for a coordinate measuring machine and a rack for storing the tool, the tool being removably connectable to a mobile arm of the coordinate measuring machine, the tool rack comprising:
   a lodging for storing the tool, the lodging has:
      guides allowing the tool to be inserted into the lodging according to a first direction and removed from the lodging along the first direction, the guides have first retaining surfaces to limit the movements of the tool in a second direction, the first retaining surfaces are on a first plane; and
      a tooth between the guides, the tooth has a second retaining surface on a second plane, the second plane is below the first plane,
   wherein the second retaining surface is adapted to engage an engaging zone of the tool so as to cause the tool to tilt from a vertical orientation.

2. The combination of claim 1, wherein the tool tilts from the vertical position when a force is applied to the tool along the second direction.

3. The combination of claim 1, wherein the first and the second planes are orthogonal to the second direction.

4. The combination of claim 1, wherein the guides are essentially rectilinear and parallel to the first direction and separated by a free space, allowing the tool to be inserted into the free space between the guides.

5. The combination of claim 1, the tool rack further comprising retaining means to dampen the tool's movements without preventing them totally.

6. The combination of claim 1, the tool rack further comprising retaining means for holding the tool in a position and in an orientation in which it has been placed.

7. The combination of claim 1, the tool rack further comprising retaining means that leave the tool mobility for a coupling operation, allowing the tool to position accurately.

8. The combination of claim 1, the tool rack further comprising retaining means that cause a friction between the tool and the guides when the tool moves in the first direction.

9. The combination of claim 8, wherein the retaining means are blade springs.

10. The combination of claim 1 wherein the engaging zone of the tool is capable of working with the guides and the retaining surfaces of the lodging.

11. The combination of claim 10, wherein the engaging zone of the tool is symmetrical relative to a symmetry axis and wherein, when the tool is inserted into the lodging, the symmetry axis is parallel to the second direction.

12. The combination of claim 10, wherein the connection between the tool and the mobile arm of the measuring machine is magnetic.

13. The combination of claim 10, wherein the connection between the tool and the mobile arm of the measuring machine is performed by an adapter capable of working with the tool fastened to the mobile arm of the measuring machine.

14. The combination of claim 13, wherein a connection force between the tool and the mobile arm or the adapter is reduced by the tilting of the tool.

* * * * *